United States Patent
Aoki et al.

(10) Patent No.: US 9,671,814 B2
(45) Date of Patent: Jun. 6, 2017

(54) LEVER DEVICE

(71) Applicant: Niles Co., Ltd., Tokyo (JP)

(72) Inventors: Yo Aoki, Tokyo (JP); Hidekazu Wakita, Tokyo (JP)

(73) Assignee: Valeo Japan Co., Ltd. (JP)

(*) Notice: Subject to any disclaimer, the term of this patent is extended or adjusted under 35 U.S.C. 154(b) by 344 days.

(21) Appl. No.: 13/921,570

(22) Filed: Jun. 19, 2013

(65) Prior Publication Data

US 2014/0000410 A1    Jan. 2, 2014

(30) Foreign Application Priority Data

Jun. 28, 2012 (JP) ................................ 2012-145898

(51) Int. Cl.
  *G05G 1/04* (2006.01)
  *B60Q 1/14* (2006.01)
(52) U.S. Cl.
  CPC .............. *G05G 1/04* (2013.01); *B60Q 1/1469* (2013.01); *Y10T 74/20612* (2015.01)
(58) Field of Classification Search
  CPC ......... Y10T 74/20612; Y10T 74/20618; Y10T 74/20732; Y10T 74/20624; Y10T 74/20582; Y10T 74/206; G05G 1/082; G05G 1/085; G05G 1/10; G05G 1/04; G05G 1/06; B60Q 1/1484; B60Q 1/425; B60Q 1/343; B60Q 1/1461; B60Q 1/40; B60Q 1/1469; B60Q 1/1453
  See application file for complete search history.

(56) References Cited

U.S. PATENT DOCUMENTS

| 5,509,327 | A  | * | 4/1996  | Cropley          | B66D 1/7468  |
|-----------|----|---|---------|------------------|--------------|
|           |    |   |         |                  | 74/545       |
| 6,495,776 | B1 | * | 12/2002 | Takahashi et al. | 200/61.54    |
| 7,152,499 | B2 | * | 12/2006 | Koide            | B60Q 1/1469  |
|           |    |   |         |                  | 74/523       |
| 7,238,899 | B2 | * | 7/2007  | Sugino           | B60Q 1/1476  |
|           |    |   |         |                  | 200/61.54    |
| 7,669,503 | B2 | * | 3/2010  | Takeshima        | B60T 7/105   |
|           |    |   |         |                  | 16/431       |
| 7,839,627 | B2 | * | 11/2010 | Tanaka et al.    | 361/679.3    |

FOREIGN PATENT DOCUMENTS

JP    2000-260265 A    9/2000

* cited by examiner

*Primary Examiner* — Adam D Rogers
(74) *Attorney, Agent, or Firm* — Fishman Stewart PLLC (57) ABSTRACT

A lever device in which a lid is mounted to an opening portion of a lever member without dropping down therefrom and with a good visual quality is disclosed. The lever device comprises a lever member swingably supported in a fixed system, an opening portion provided in the lever member to open in a radial direction, and a lid that is engaged to the opening portion to cover the opening portion therewith, wherein the lid is provided with a thin portion. Deflections are generated in such a manner as to concentrate on the thin portion of the lid.

10 Claims, 9 Drawing Sheets

LEVER DEVICE

CROSS-REFERENCE TO RELATED APPLICATION

This application claims priority under 35 USC 119 from Japanese Patent Application No. 2012-145898 filed on Jun. 28, 2012, the disclosure of which is incorporated by reference herein.

BACKGROUND OF THE INVENTION

Field of the Invention

The present invention relates to a lever device, and in detail, to a lever device for a vehicle.

Description of the Related Art

Figure 9:
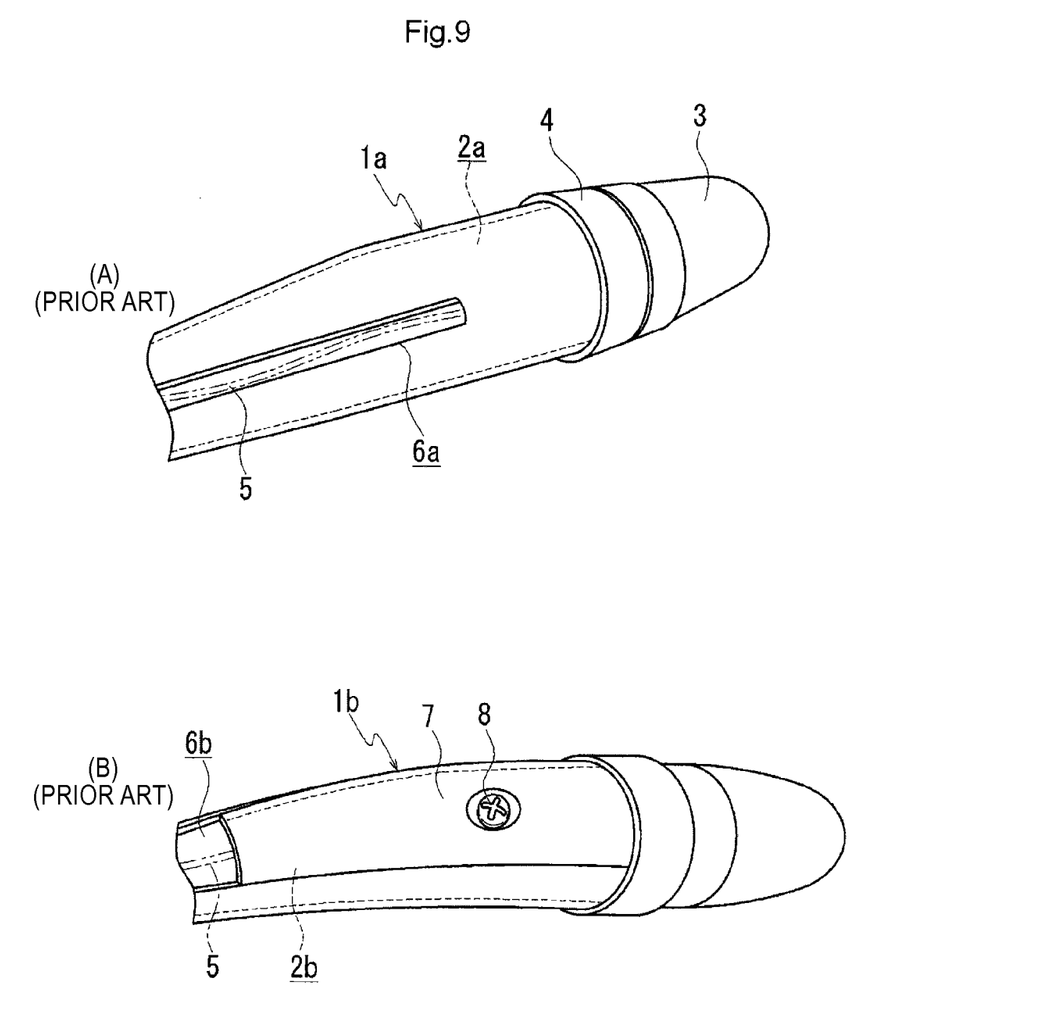
FIGS. 9A and 9B are perspective views each showing an operation lever in the conventional operation instruction device.

A vehicle is provided with an operation instruction device (lever device) equipped with an operation lever and a plurality of switches, as a device that inputs operation instructions to an illuminating device, a wiper device, a directional indicator (winker) and the like. FIGS. 9A and 9B show an operation lever in a conventional operation instruction device. As shown in FIG. 9A, an operation lever 1a is formed by plastic molding, and a hollow portion 2a along an axial direction of the operation lever 1a is formed inside the operation lever 1a. The operation lever 1a has an end portion (hereinafter, called one end portion), which is provided with a push switch 3 and rotary switches 4 that are operated by an operator, at the opposite side to an end portion in a steering column side (hereinafter, called the other end portion) in a vehicle.

The push switch 3 is fitted in the one end portion of the hollow portion 2a to be fixed thereto, and the rotary switch 4 is fitted in an outer peripheral portion of the one end portion in the operation lever 1a to be fixed thereto. The operation lever 1a has the other end portion provided with an opening portion 6a formed therein, and has the hollow portion 2a where a harness 5 is wired through the opening portion 6a.

The harness 5 connects the push switch 3 and the rotary switches 4 to an unillustrated controller in the vehicle body. In such a conventional operation lever 1a, since the operation lever 1a protects the harness 5, damages of the harness 5 are prevented. However, a lid is not provided in the opening portion 6a to make the inside of the operation lever 1a viewable, and therefore there is a problem that a visual quality of the operation lever 1a is low.

Therefore, an operation lever in which a lid is provided in the opening portion is proposed. FIG. 9B is a schematic diagram showing this operation lever 1b. The operation lever (lever member) 1b is formed by plastic molding, and is provided with an opening portion 6b and a hollow portion 2b as similar to the above-mentioned operation lever 1a. The operation lever 1b is provided with a lid 7 fixed to the opening portion 6b, and the low visual quality thereof is improved by covering at least a part of the harness 5 or the hollow portion 2b with this lid 7. It should be noted that, for example, Japanese Patent Laid-Open Publication No. 2000-260265 describes this kind of prior art.

In a case of this operation lever, however, the lid only covers the opening portion, and strength in the mounting portion between the operation lever and the lid is low. Therefore when a bending moment acts on the lid by a swing operation of the operation lever or the like, damages are generated in the mounting portion between the operation lever and the lid due to the stress, thereby creating a possibility that the lid drops down from the opening portion.

Therefore in a case of the operation lever 1b shown in FIG. 9B, the lid 7 is fixed by a screw 8, but a head portion of the screw 8 is exposed from the surface of the operation lever 1b. As a result, there is a problem that the low visual quality of the operation lever 1b can not be solved completely. Therefore it is required to mount the lid to the opening portion of the lever member without dropping down therefrom or deteriorating the visual quality.

SUMMARY OF THE INVENTION

Therefore the present invention is made in view of the foregoing problems, and an object of the present invention is to provide a lever device equipped with a lid mounted to an opening portion without dropping down from a lever member or deteriorating a visual quality thereof.

According to an aspect of the present invention, a lever device comprises a lever member swingably supported in a fixed system, an opening portion formed in the lever member to open in a radial direction of the lever member, and a lid that is engaged to the opening portion to cover the opening portion therewith, wherein the lid is provided with a thin portion.

According to the aspect of the present invention, deflections are generated in such a manner as to concentrate on the thin portion of the lid, and are not difficult to be generated on the other portion of the lid. Therefore damages in the engagement portion between the lid and the opening portion can be prevented, thus preventing the dropping of the lid due to the damage. In addition, since the inside of the opening portion is covered with the lid, a visual appearance and visual quality of the lever member are largely improved.

BRIEF DESCRIPTION OF THE DRAWINGS

Other objects, features, and advantages of the present invention will become more apparent from the following detailed description made with reference to the accompanying drawings, in which like parts are designated by like reference numbers and in which:

FIGS. 4A to 4H are transverse cross-sections in FIG. 3.

FIGS. 8A to 8C are explanatory diagrams showing the mounting procedure of the lid according to the embodiment in the present invention.

DESCRIPTION OF THE PREFERRED EMBODIMENTS

Hereinafter, a lever device according to an embodiment in the present invention, which is applied to an operation instruction input device, will be explained with reference to the accompanying drawings. It should be noted that in the explanation of the present embodiment, components identical to those in the conventional technology are referred as to identical codes for easy understanding, and the detailed explanation is omitted.

Figure 1:
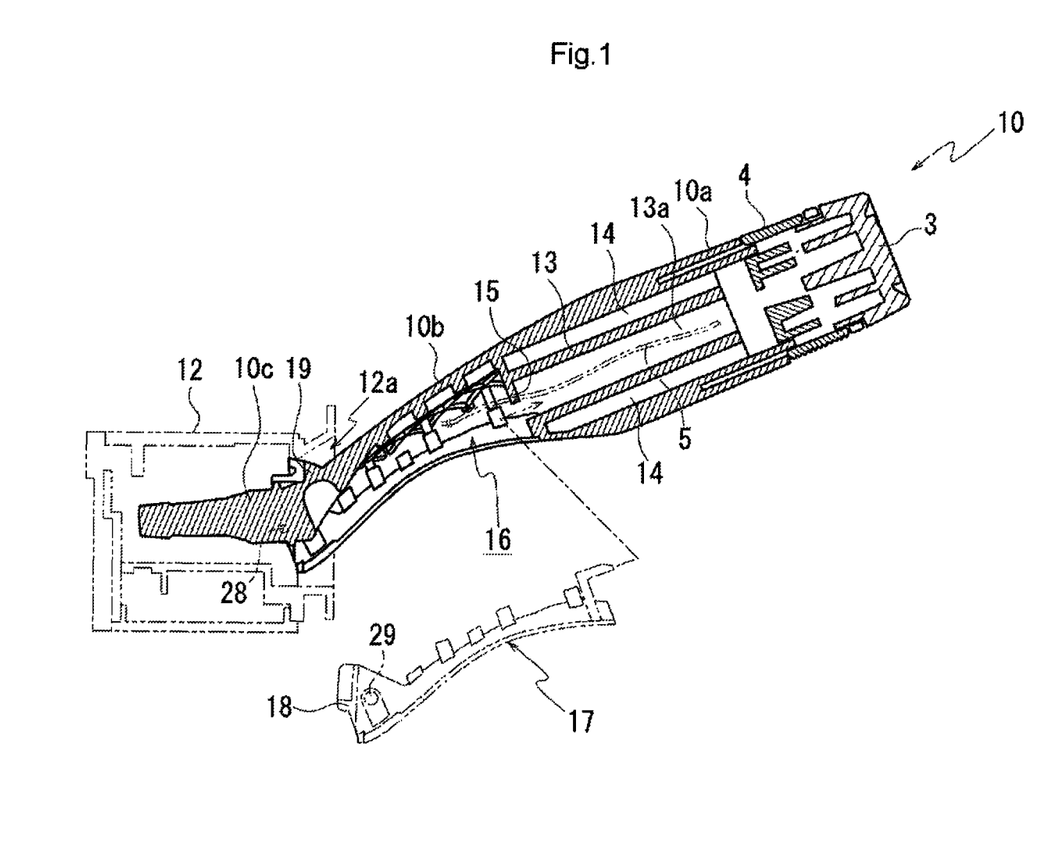
FIG. 1 is a partial cutaway cross section showing an operation lever (lever member) in a lever device according to an embodiment in the present invention.

FIG. 1 is a cross section showing an operation lever (lever member) of an operation instruction device (lever device) that inputs operation instructions to an illuminating device in a vehicle body front portion for a vehicle, a directional indicator in each of vehicle body side portions thereof, a wiper device of a windshield and the like.

As shown in FIG. 1, the operation lever 10 is made of resin, and comprises an operation portion 10a operable by hands, a curved portion 10b formed to be integral with the operation portion 10a, and a base portion 10c formed to be integral with the curved portion 10b. The operation portion 10a is formed in a cylindrical shape, and the curved portion 10b is formed in a cylindrical shape to open toward a side of a case 12 of a steering column. A cylindrical portion 13 is arranged in an axis center portion of the operation portion 10a to wire a harness 5, and an outer surface of the cylindrical portion 13 and an inner surface of the operation portion 10a are connected by a plurality of ribs 14 that are provided in a circumferential direction to have intervals therebetween.

An end portion of the curved portion 10b at a side of the case 12 forms part of a spherical swollen portion 19 (refer to FIGS. 2 and 3) across an entire circumference of the curved portion 10b, and the base portion 10c is formed to be integral with an inner surface of the curved portion 10b. The base portion 10c of the operation lever 10 extends from an inner surface of the swollen portion 19 toward the side of the case 12, and is pivotally supported on a pivotal support portion (not shown) of the case 12 to be swingable. Therefore when the base portion 10c swings in association with an operation of the operation lever 10, switches (not shown) inside the case 12 are switched by the swinging base portion 10c. A push switch 3 and a rotary switch 4 are mounted on an end portion of the operation portion 10a at the opposite side to the base portion 10c, and these push switch 3 and rotary switch 4 are connected to a controller (not shown) in the vehicle via the harness 5 inserted into the operation portion 10a from an opening portion 16 of the curved portion 10b. The opening portion 16 in the curved portion 10b is provided to open in a radial direction (direction perpendicular to a longitudinal direction of the operation lever 10), and a lid 17 is provided in the opening portion 16 to cover the opening portion 16 therewith.

Figure 2:
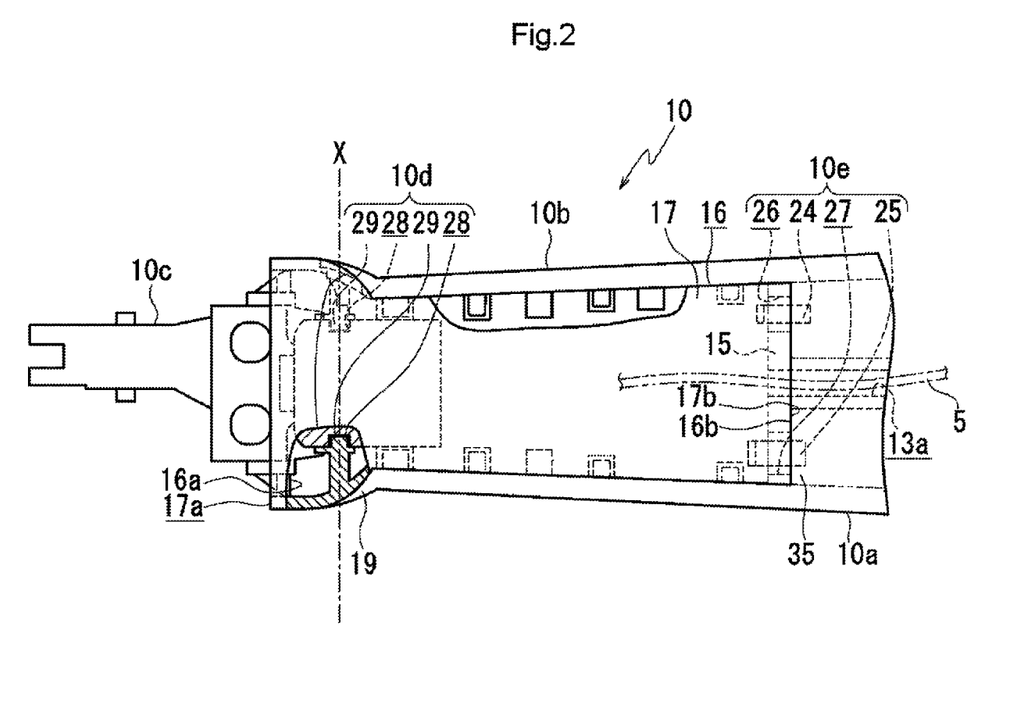
FIG. 2 is a plan view of a curved portion showing an opening portion and a lid according to the embodiment in the present invention.

FIG. 2 is a plan view showing the curved portion 10b as viewed from a side of the opening portion 16. As shown in FIG. 2, the opening portion 16 is formed in the curved portion 10b at a side of the base portion 10c, and is formed in a rectangular shape extending in an axial direction of the operation lever 10 from an end surface of the swollen portion 19 at a side of the case 12. The lid 17 for covering the opening portion 16 is also formed in a rectangular shape to be engaged (fitted) to the opening portion 16.

Next, a mounting structure of the lid 17 to the opening portion 16 will be explained with reference to FIG. 3 to FIG. 6.

Figure 3:
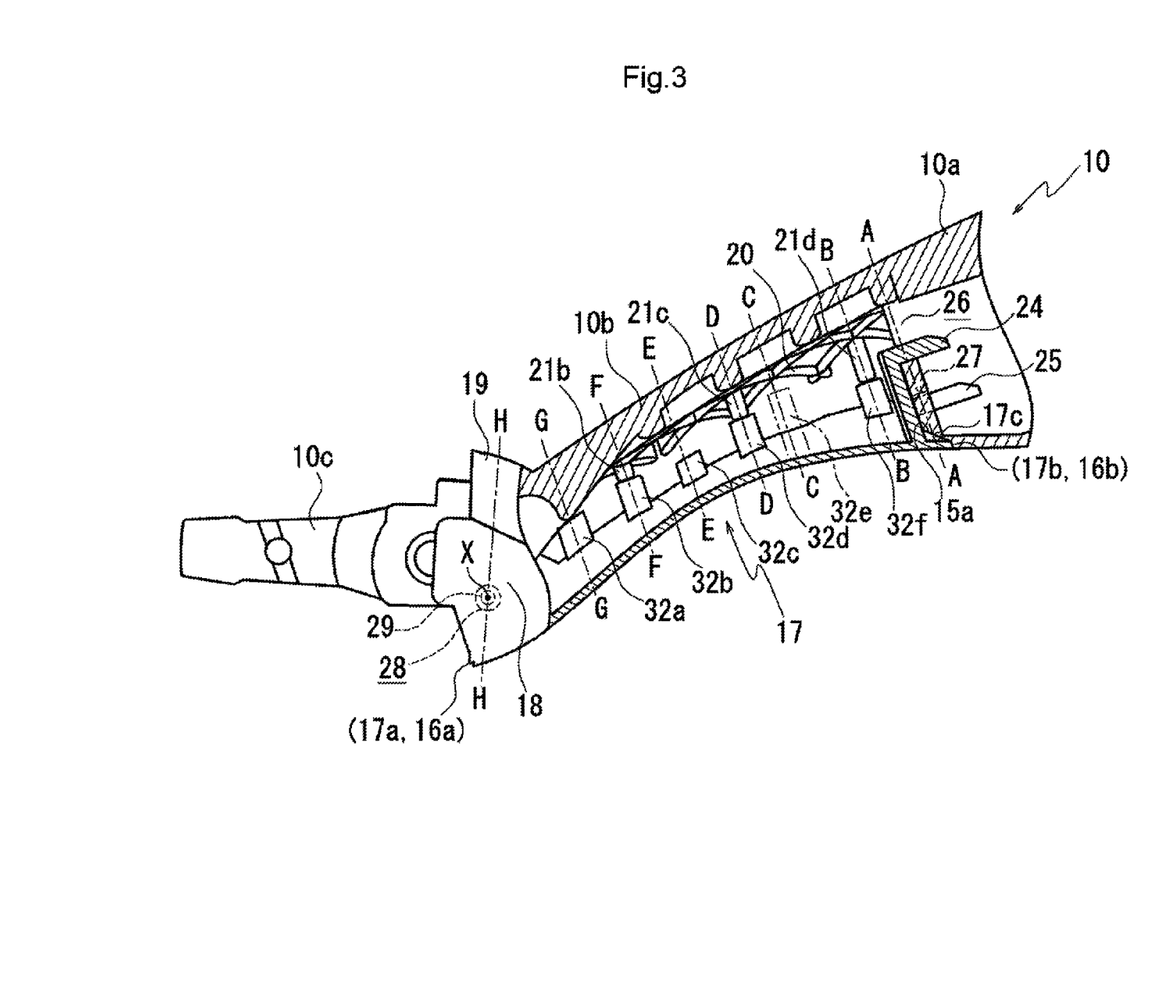
FIG. 3 is a cross section of the curved portion according to the embodiment in the present invention.
Figure 4:
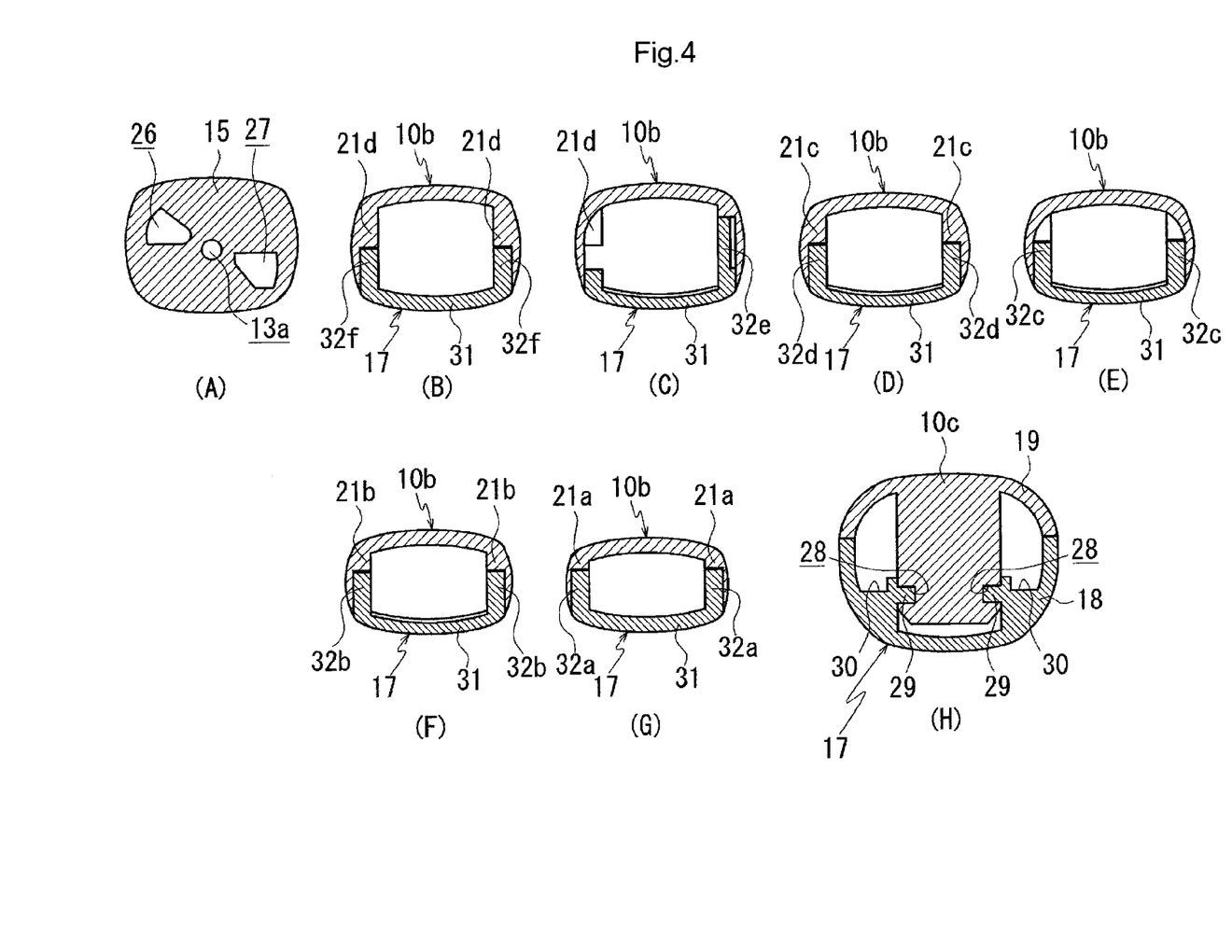
Figure 5:
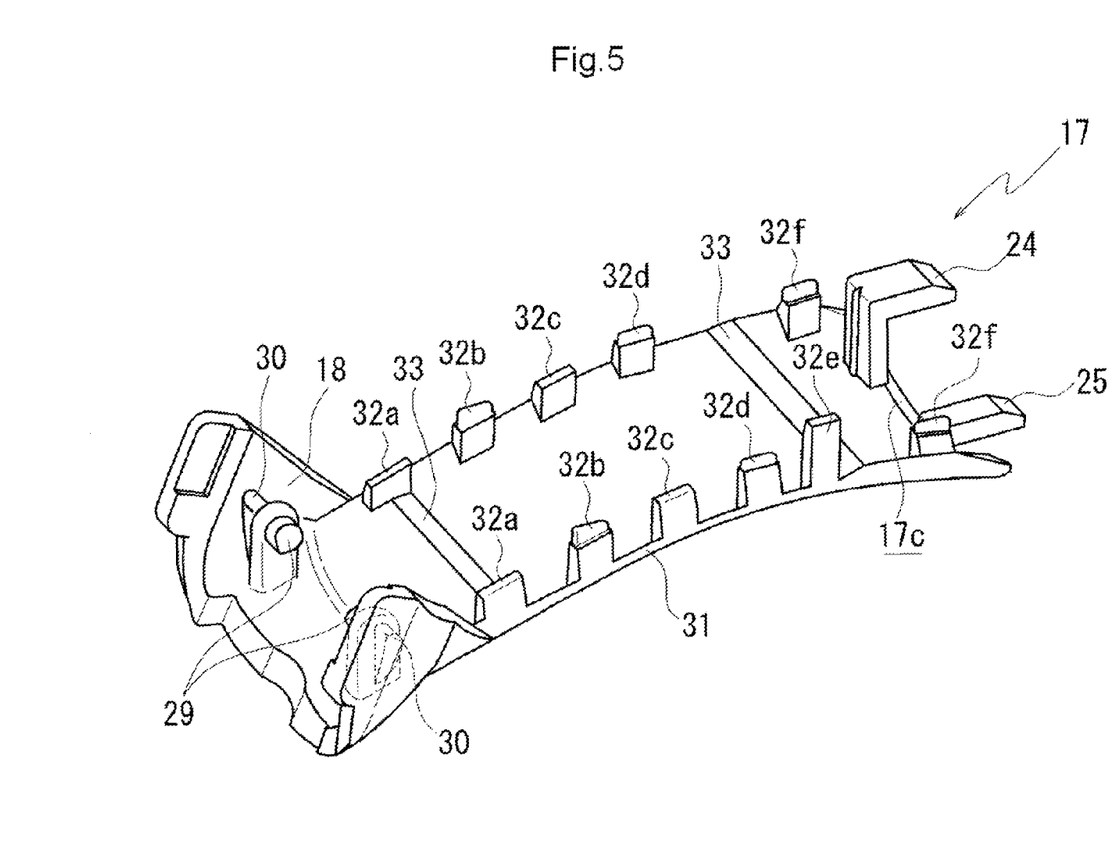
FIG. 5 is a perspective view showing the lid according to the embodiment in the present invention.
Figure 6:
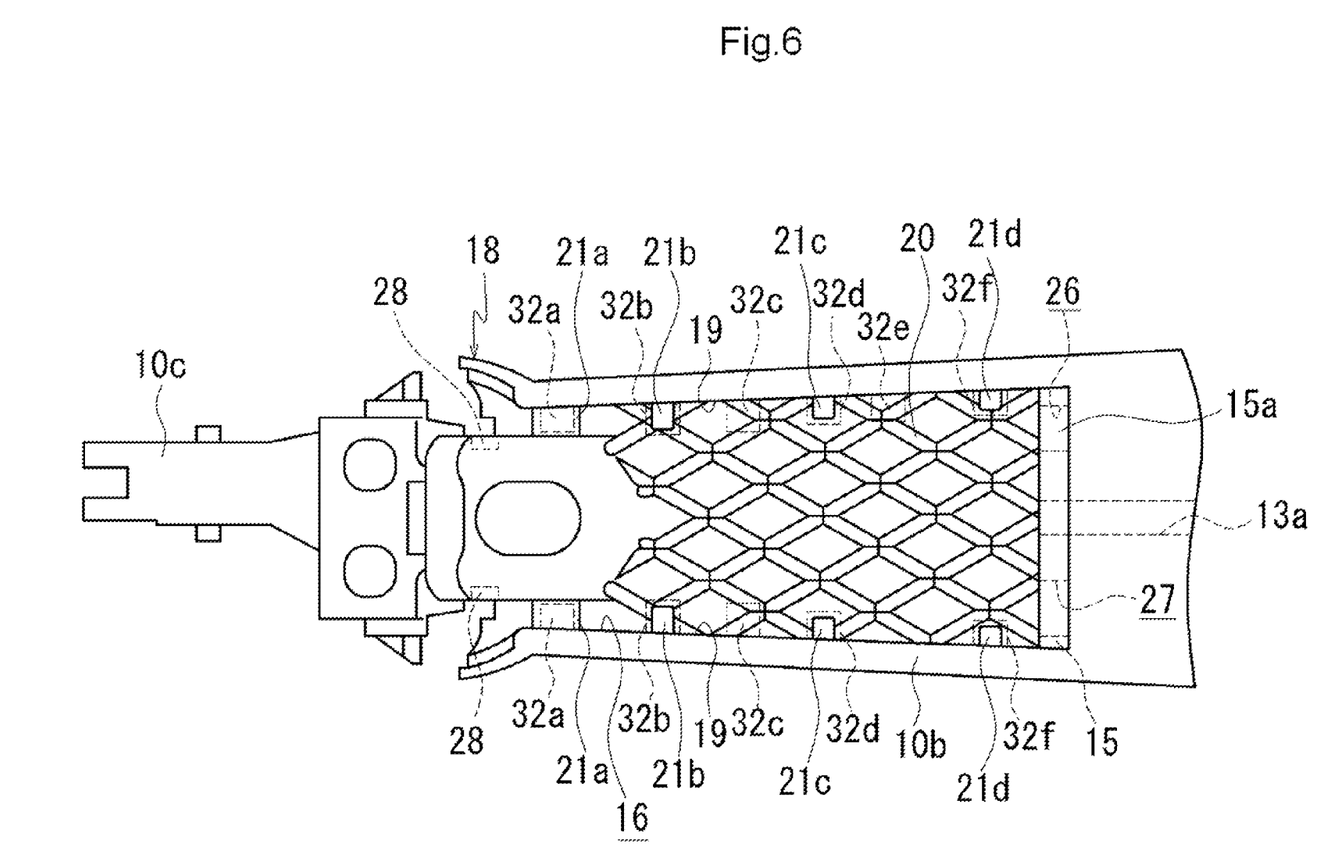
FIG. 6 is a plan view of the curved portion showing the opening portion of the lid and an inside of the curved portion according to the embodiment in the present invention.

FIG. 3 is a cross section of the curved portion 10b, and FIGS. 4A to 4H are transverse cross-sections in FIG. 3, wherein FIG. 4A is a cross section taken along lines A-A in FIG. 3, FIG. 4B is a cross section taken along lines B-B in FIG. 3, FIG. 4C is a cross section taken along lines C-C in FIG. 3, FIG. 4D is a cross section taken along lines D-D in FIG. 3, FIG. 4E is a cross section taken along lines E-E in FIG. 3, FIG. 4F is a cross section taken along lines F-F in FIG. 3, FIG. 4G is a cross section taken along lines G-G in FIG. 3, and FIG. 4H is a cross section taken along lines H-H in FIG. 3. FIG. 5 is a perspective view showing the lid 17 as viewed from the backside of the opening portion 16, and FIG. 6 is a plan view showing the curved portion 10b as viewed from a side of the lid 17, showing an inside of the curved portion 10b (opening portion 16).

The lid 17 is, as shown in FIG. 2, mounted to the curved portion 10b (opening portion 16) through a first fitting portion 10d and a second fitting portion 10e. The first fitting portion 10d is provided on one end portion 17a of the lid 17 in the axial direction (longitudinal direction) of the operation lever 10 and on one end portion 16a of the opening portion 16 facing the one end portion 17a, and the second fitting portion 10e is provided on the other end portion 17b of the lid 17 in the axial direction (longitudinal direction) of the operation lever 10 and on the other end portion 16b of the opening portion 16 facing the other end portion 17b.

The first fitting portion 10d comprises, as shown in FIG. 4H, concave portions 28 provided on both side faces of the base portion 10c, and axis portions 29 provided in axis support portions 18 of the lid 17. The axis portions 29 are formed to project to a radial inside from inner surfaces facing the concave portions 28 of the base portion 10c, and are fitted in the concave portions 28 from a direction perpendicular to the axial direction (longitudinal direction) of the operation lever 10. Thereby the one end portion 17a of the lid 17 is rotatably supported in the one end portion 16a of the opening portion 16 around an axis line X perpendicular to the longitudinal direction of the operation lever 10.

It should be noted that the axis support portions 18 respectively can flexibly be expanded/compressed, and the concave portions 28 are fitted in the axis portions 29 by flexible expansion and compression of the axis support portions 18. In addition, a root of the axis portion 29 is connected to the inner surface of the axis support portion 18 through a rib 30, and is reinforced by the rib 30.

The second fitting portion 10e, as shown in FIG. 2, comprises concave portions (holes) 26 and 27 that are provided on a flange portion 15 radially traversing the curved portion 10b, and engagement pieces 24 and 25 that are provided on an inner surface of the other end portion 17b in the lid 17, and the second fitting portion 10e is provided near a connecting portion 35 between the operation portion 10a and the curved portion 10b, and is provided in a facing portion of the curved portion 10b to the opening portion 16.

As shown in FIG. 4A, the concave portion (hole) 26 is provided in a left upper side of the flange portion 15, and the concave portion 27 is provided in a right lower side of the flange portion 15. As shown in FIG. 2, the engagement pieces 24 and 25 of the lid 17 extend in the axial direction (longitudinal direction) of the operation lever 10 from the inner surface of the lid 17. When the lid 17 is mounted to the opening portion 16, the engagement pieces 24 and 25 are fitted in the concave portions 26 and 27 from the axial direction (longitudinal direction) of the operation lever 10 to have a clearance therebetween, and therefore, are provided to be supported by the concave portions 26 and 27 in a state of being movable in the axial direction.

The flange portion 15 is, as shown in FIG. 3, provided with a support surface 15a for guiding the engagement pieces 24 and 25 of the lid 17 to the concave portions (holes) 26 and 27 of the flange portion 15 for fitting. In addition, the lid 17 has the inner surface, which is in a position opposing the support surface 15a, provided with a supported surface 17c supported by the support surface 15a of the flange portion 15.

The support surface 15a of the flange portion 15 has a tapered surface that is gradually reduced in a diameter from the operation portion 10a toward the axis support portion 18, and the supported surface 17c of the lid 17 has a reversely tapered surface that is engaged to the support surface 15a of the flange portion 15. In the present embodiment, the engagement pieces 24 and 25 are formed to be bent in an L-letter shape (refer to FIG. 5) such that the engagement pieces 24 and 25 can more easily be guided toward the concave portions 26 and 27 by the support surface 15a. It should be noted that the curved portion 10b has an inner surface that is provided with a rib 20 formed in a lattice shape or mesh shape for securing the strength of the curved portion 10b (refer to FIG. 6).

FIG. 5 is a perspective view showing the lid 17 as viewed from a side of the opening portion 16. The lid 17 has the inner surface that is provided with a thin portion 31 formed along a deflection line of the lid 17. The thin portion 31 is provided for the purpose that a bending moment of the lid 17 acting on the lid 17 in a swinging direction (swinging direction of a passing operation or washer operation) of the operation lever 10 is alleviated by the deflection of the thin portion 31 to alleviate the stress acting on the first fitting portion 10d and the second fitting portion 10e. The thin portion 31 is, as shown in FIG. 5, provided along the deflection line of the lid 17 to be formed across an entire surface in an inside from uneven portions 33 positioned at the outside of the lid 17. In addition, the lid 17 that is positioned outside of the uneven portions 33 in the longitudinal direction is formed to be thicker than the thin portion 31.

In addition, the lid 17 has the inner surface that is provided with a plurality of leg portions (support portions) 32a to 32f for supporting the lid 17 with the inner surface of the curved portion 10b and for connecting the outer surface of the lid 17 to the outer surface of the curved portion 10b without unevenness therebetween at the time of covering the opening portion 16 with the lid 17 (refer to FIGS. 4B to 4G). In addition, the curved portion 10b has the inner surface that is provided with a plurality of platforms 21a to 21d formed for supporting the plurality of the leg portions 32a to 32f.

Intervals between the leg portions 32a to 32f (interval between the adjacent leg portions) in the axial direction of the operation lever 10 respectively are, as shown in FIGS. 3 and 6, set such that, as the leg portions 32a to 32f are seated on (make contact with) the platforms 21a to 21d, the swollen portion 19 and the axis support portion 18 are connected with no clearance from each other, and the lid 17 and the curved portion 10b are connected smoothly with no unevenness therebetween, and a length of each of the leg portions 32a to 32f is set in the same way. Further, the intervals between the leg portions 32a to 32f are determined such that the deflection of the lid 17, particularly the deflection of the thin portion 31 can be suppressed at the time the lid 17 is locally pressed by, for example, fingers in each point of the outer surface of the lid 17. It should be noted that each of the plurality of the leg portions (support portions) 32a to 32f has an apex surface that is formed in a mountain shape for stable support of the lid 17 (refer to FIG. 5).

Figure 7:
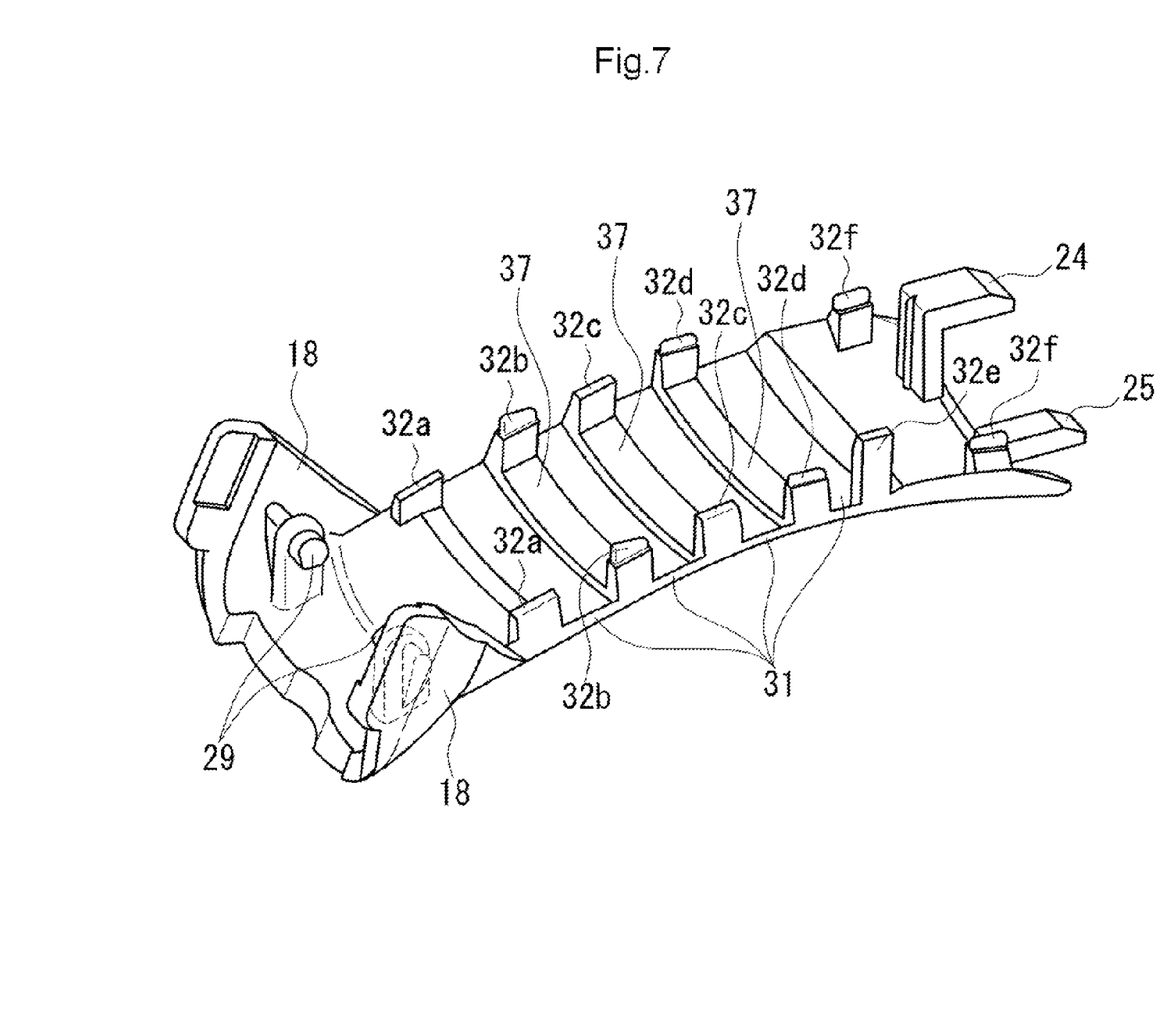
FIG. 7 is a perspective view showing another example of a thin portion according to the embodiment in the present invention.

FIG. 7 is a diagram showing another embodiment of the thin portion 31, and is a perspective view as viewed from a side of the opening portion 16. As shown in FIG. 7, a plurality of thin portions 31 may be formed to have a thick portion 37 between the respective thin portions 31 in the longitudinal direction of the lid 17. It should be noted that also in regard to the lid 17 in FIG. 6, even if a bending moment acts on the operation lever 10 in the aforementioned swing direction of the operation lever 10, damages of the lid 17 and the dropping of the lid 17 from the opening portion 16 can be prevented. It should be noted that the lid 17 in FIG. 5 is more excellent in view of the manufacture and visual appearance as compared to that in FIG. 7. That is, since the lid 17 in FIG. 7 is configured such that the thin portions 31 and the thick portions 37 are alternately formed along the axial direction, shrinkage cavities tend to be easily generated at the molding thereof, which makes the visual quality of the visual appearance be deteriorated, but since the lid 17 in FIG. 5 is formed of the successive thin portion 31, the shrinkage cavities are difficult to be generated, which makes the visual quality of the visual appearance be improved.

Next, the mounting procedure of the lid 17 will briefly be explained with reference to FIG. 2, FIG. 3 and FIGS. 8A to 8C.

Figure 8:
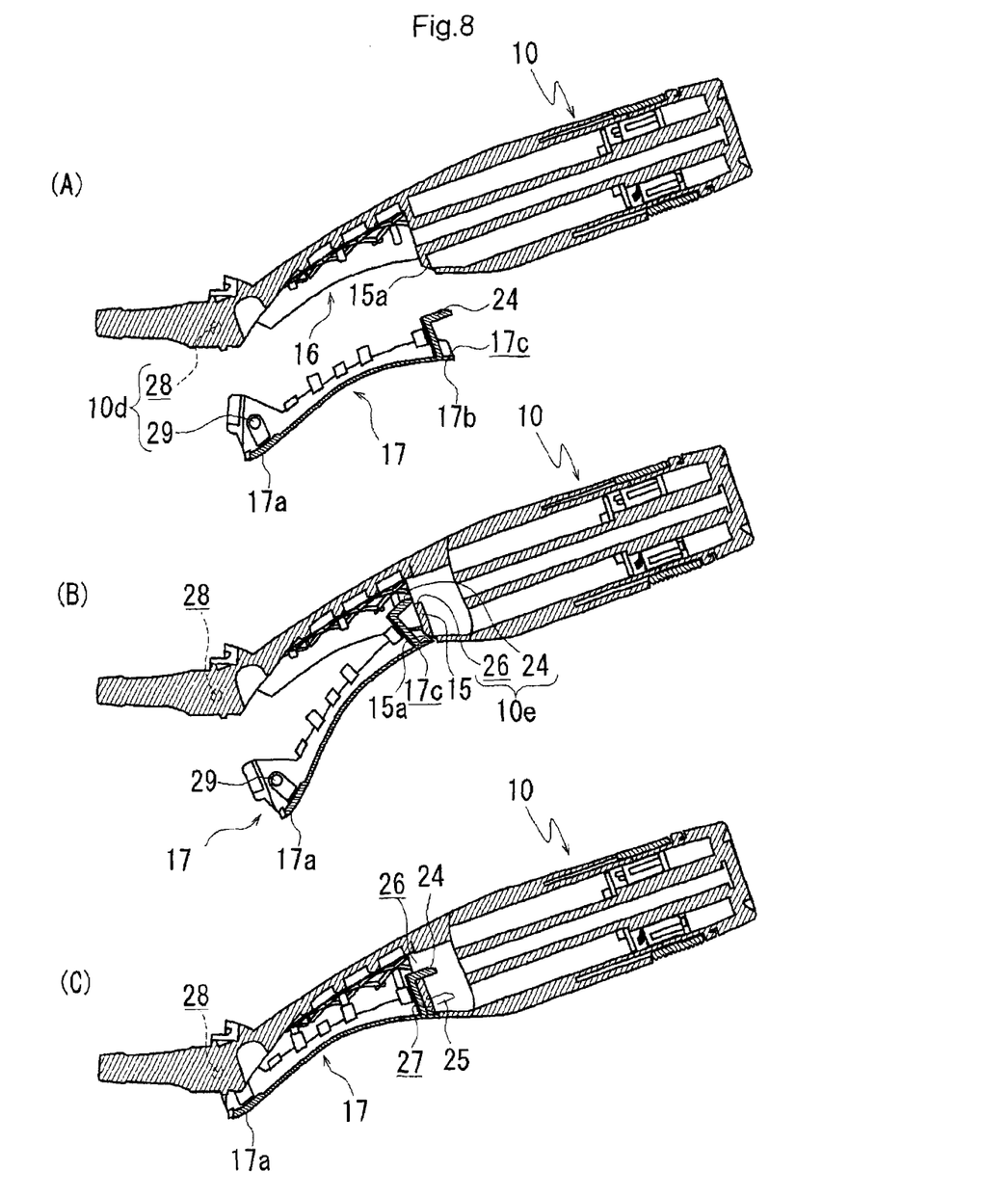

FIGS. 8A to 8C are explanatory diagrams showing the mounting procedure of the lid 17, wherein FIG. 8A shows a state before the lid 17 is mounted, FIG. 8B shows a fitting state of the second fitting portion 10e, and FIG. 8C shows a state after the lid 17 is mounted. At the time of mounting the lid 17, the inner surface of the lid 17 is first exposed to the opening portion 16 (refer to FIG. 8A), and next, the supported surface 17c of the other end portion 17b in the lid 17 is supported by the support surface 15a of the flange portion 15. In this state, as the side of the one end portion 17a of the lid 17 is moved to be close to the side of the opening portion 16 by using the supported surface 17c of the lid 17 as a fulcrum, the engagement pieces 24 and 25 of the lid 17 are guided into the concave portions 26 and 27 in the flange portion 15 (refer to FIG. 8B). As the side of the one end portion 17a of the lid 17 is moved to be closer to the side of the opening portion 16 in this state, the axis portions 29 of the lid 17 move to a position in accordance with the concave portions 28 of the base portion 10c, thus substantially completing the fitting of the lid 17 in the opening portion 16 (refer to FIG. 3 and FIG. 8B). After that, as the side of the one end portion 17a of the lid 17 (left side in FIGS. 8A to 8C) is further pushed to the side of the opening portion 16, in a position where the axis portions 29 of the axis support portions 18 respectively are in accordance with the concave portions 28 of the base portion 10c, the axis portions 29 are fitted in the concave portions 28 by the flexible force of the axis support portions 18 as shown in FIG. 8C (refer to FIG. 4H). As a result, the mounting of the lid 17 is completed, thus creating a state where the opening portion 16 is covered with the lid 17. In this state, as shown in FIG. 2, since the harness 5 can not be viewed from outside and also there is no member for mounting the lid 17 on the outer surface of the lid 17, the visual appearance and visual quality of the lever member 10 can largely be improved as compared to the conventional operation lever 1b the lid 7 of which is mounted by the screw in FIG. 9B.

In this way, the operation lever 10 according to the present embodiment is configured to be able to obtain the strength against the bending moment with the reinforcement by the cylindrical portion 13, the rib 14 and the rib 20, and the thin portion 31 can prevent the lid 17 from dropping down from the opening portion 16. In addition, the first fitting portion 10d and the second fitting portion 10e respectively are formed on the inner surface of the lid 17 and, not on the outer surface, but on the inner surface of the curved portion 10b. Therefore the operation lever 10 can achieve the excellent effect that the visual appearance and visual quality in the curved portion 10*b* can largely be improved.

According to the aspect of the present invention, in the lever device in which the opening portion 16 that opens in the radial direction is provided in the lever member (operation lever 10) swingably supported in the fixed system (steering column), and the lid 17 that is engaged to the opening portion 16 to cover the opening portion 16 therewith is provided, the thin portion 31 is provided in the lid 17.

According to this configuration, since the lid 17 is engaged to the opening portion 16 to hide the inside of the opening portion 16 with the lid 17, the visual appearance and visual quality of the lever member (operation lever 10) are improved.

In addition, when the bending moment acts on the lever member (operation lever 10) in the aforementioned operation direction, the bending moment acts on the lever member (operation lever 10) and the lid 17 to generate the deflection therein, but as the thin portion 31 is provided in the lid 17, the deflection concentrates on the thin portion 31 in the lid 17, and is difficult to be generated on the other portion of the lid 17.

Therefore the deflection is difficult to be generated in the engagement portion (first fitting 10*d* and second fitting portion 10*e*) between the opening portion 16 and the lid 17, and the stress therein is also lowered. As a result, generation of damages in the engagement portion (first fitting portion 10*d* and second fitting portion 10*e*) between the opening portion 16 and the lid 17 can be prevented to prevent the dropping of the lid 17.

In addition, the lever device is configured such that the one end portion 17*a* of the lid 17 in the axial direction of the lever member (operation lever 10) and the one end portion 16*a* of the opening portion 16 opposing the one end portion 17*a* are rotatably fitted with each other around the axis line X perpendicular to the axial direction of the lever member (operation lever 10). The other end portion 17*b* of the lid 17 in the axial direction of the lever member (operation lever 10) and the other end portion 16*b* of the opening portion 16 opposing the other end portion 17*b* are relatively movably fitted with each other in the axial direction of the lever member (operation lever 10).

According to this configuration, as the bending moment (bending moment in the swing direction of the passing operation or washer operation) acts on the lid 17, in the axial direction of the lever member (operation lever 10) the one end portion 17*a* of the lid 17 rotates around the axis line X perpendicular to the axial direction of the lever member (operation lever 10), and the other end portion 17*b* of the lid 17 relatively moves to the other end portion 16*b* of the opening portion 16 in the axial direction of the lever member (operation lever 10). At this time the one end portion 17*a* of the lid 17 and the one end portion 16*a* of the opening portion 16 rotate in a direction of reducing the deflection of the thin portion 31 with each other in the axial direction of the lever member (operation lever 10), and the other end portion 17*b* of the lid 17 and the other end portion 16*b* of the opening portion 16 relatively move in a direction of reducing the deflection of the thin portion 31 with each other in the axial direction of the lever member (operation lever 10). Therefore even if the bending moment acts on the lid 17, the damage in the engagement portion between the lid 17 and the opening portion 16 is prevented and the dropping of the lid 17 is prevented. In addition, the relative movement and the rotation enable the stress acting on the lid 17 to be alleviated.

Further, the lever device is configured such that the first fitting portion 10*d* is provided in the one end portion 17*a* of the lid 17 in the axial direction of the lever member (operation lever 10) and in the one end portion 16*a* of the opening portion 16 opposing the one end portion 17*a* to be rotatably fitted with each other around the axis line X perpendicular to the axial direction of the lever member (operation lever 10), and the second fitting portion 10*e* is provided in the other end portion 17*b* of the lid 17 in the axial direction of the lever member (operation lever 10) and in the other end portion 16*b* of the opening portion 16 opposing the other end portion 17*b* to be relatively movably fitted with each other in the axial direction of the lever member (operation lever 10), wherein the first fitting portion 10*d* comprises the axis portions 29 and the concave portions 28 that are fitted with each other, and the second fitting portion 10*e* comprises the engagement pieces 24 and 25 and the concave portions 26 and 27 that are fitted with each other.

According to this configuration, the first fitting portion 10*d* rotates around the axis center line perpendicular to the axial direction of the lever member (operation lever 10), and the second fitting portion 10*e* relatively moves with each other in the axial direction of the lever member (operation lever 10). Therefore the stress acting on the engagement portion between the lid 17 and the opening portion 16 is alleviated to prevent the dropping of the lid 17. In addition, the relative movement and the rotation enable the stress acting on the lid 17 to be alleviated.

In addition, since the deflection amount of the thin portion 31 is made small and the stress is made small, the strength of the thin portion 31 is also substantially increased. Further, the axis portions 29 are fitted in the concave portions 28 to have a clearance therebetween in such a manner that the first fitting portion 10*d* is rotatable around the axis line perpendicular to the axial direction of the lever member (operation lever 10). Therefore it is possible to mount the axis portion 29 to the concave portion 28 also in the diameter-reduced portion as the one end portion of the lever member (operation lever 10).

In addition, the plurality of the support portions (leg portions 32*a* to 32*f*) that are seated on the inner surface of the lever member (operation lever 10) to support the lid 17 are provided on the inner surface of the lid 17 by intervals, and each length of the plurality of the support portions (leg portions 32*a* to 32*f*) is defined such that the outer surface of the lid 17 is connected continuously to the outer surface of the lever member (operation lever 10).

According to this configuration, even if the lid 17 is pushed by hands, the deflection of the lid 17, particularly of the thin portion 31 is eliminated and the unevenness between the lid 17 and the outer surface of the lever member (operation lever 10) is eliminated. Therefore the visual appearance and visual quality of the lever member (operation lever 10) are improved.

It should be noted that the thin portion 31 may be formed between the one end portion 17*a* and the other end portion 17*b* of the lid 17 in the axial direction of the lever member (operation lever 10), preferably in the intermediate portion in the axial direction of the lever member (operation lever 10). With this configuration, the deflection concentrates on the thin portion 31 and no deflection is generated on the other portion of the lid 17. In addition, the thin portion 31 may be formed on the outer surface side of the curved portion 10*b*, but is preferably formed inside the lid 17 for eliminating the unevenness on the surface of the curved portion 10*b* to improve the visual quality.

In addition, as shown in FIG. 7, the thin portions 31 and the thick portions 37 may alternately be formed to have an interval therebetween in the axial direction of the lever member (operation lever 10). In this way, even if a plurality of the thin portions 31 and a plurality of the thick portions 37 are alternately formed in the lid 17, each thin portion 31 is deflected, and it is difficult for the deflection to be generated in the other portion in the lid 17. Therefore it is suppressed for the damage to be generated in the first fitting portion 10d and the second fitting portion 10e, thus preventing separation of the lid 17 from the opening portion 16.

In the present embodiment, the explanation is made in such a manner that the axis portions 29 of the first fitting portion 10d and the engagement pieces 24 and 25 of the second fitting portion 10e are formed in the lid 17, and the concave portions 28 of the first fitting portion 10d and the concave portions 26 and 27 of the second fitting portion 10e are formed in the side of the curved portion 10b, but the embodiment may be configured such that the axis portions 29 of the first fitting portion 10d and the engagement pieces 24 and 25 of the second fitting portion 10e are formed in the side of the curved portion 10b, and the concave portions 28 of the first fitting portion 10d and the concave portions 26 and 27 of the second fitting portion 10e are formed in the lid 17.

Further, the explanation in the present embodiment is made in such a manner that the leg portions (support portions) 32a to 32f are formed in the lid 17 and the platforms 21a to 21d are formed on the inner surface of the curved portion 10b to support the lid 17 by the inner surface of the curved portion 10b, but the embodiment may be configured such that the leg portions (support portions) 32a to 32f are formed on the inner surface of the curved portion 10b and the platforms 21a to 21d are formed on the inner surface of the lid 17.

While only the selected embodiment has been chosen to illustrate the present invention, it will be apparent to those skilled in the art from this disclosure that various changes and modifications can be made therein without departing from the scope of the invention as defined in the appended claims. Furthermore, the foregoing description of the embodiment according to the present invention is provided for illustration only, and not for the purpose of limiting the invention as defined by the appended claims and their equivalents.

3 PUSH SWITCH
4 ROTARY SWITCH
5 HARNESS
10 OPERATION LEVER
10a OPERATION PORTION
10b CURVED PORTION
10c BASE PORTION
10d FIRST FITTING PORTION
10e SECOND FITTING PORTION
12 CASE
13 CYLINDRICAL PORTION
14 RIB
15 FLANGE PORTION
16 OPENING PORTION
17 LID
17a ONE END PORTION
17b OTHER END PORTION
17c SUPPORTED PORTION
18 AXIS SUPPORT PORTION
19 SWOLLEN PORTION
20 RIB
21a PLATFORM
24 ENGAGEMENT PIECE
26 CONCAVE PORTION
27 CONCAVE PORTION
28 CONCAVE PORTION
29 AXIS PORTION
30 RIB
31 THIN PORTION
32a LEG PORTION
33 UNEVENNESS PORTION
35 CONNECTING PORTION
37 THICK PORTION
X AXIS LINE

What is claimed is:

1. A lever device comprising:
a lever member swingably supported in a fixed system;
an opening portion provided in the lever member to open in a radial direction of the lever member; and
a lid that is engaged to the opening portion to cover the opening portion therewith, wherein an inner surface of the lid is provided with a deflecting portion configured to deflect in response to a bending moment acting on the lid at the time of a swing operation of the lever member;
wherein the lid includes uneven portions spaced apart axially, the deflecting portion being formed between the uneven portions, and the lid having portions outside of the uneven portions that are thicker than the deflecting portion;
wherein the lid has a plurality of support portions on the inner surface of the lid and having intervals between the plurality of support portions, the plurality of support portions being seated on an inner surface of the lever member to support the lid, and each length of the plurality of support portions is defined such that an outer surface of the lid is connected continuously to an outer surface of the lever member.

2. A lever device according to claim 1, wherein:
one end portion of the lid and one end portion of the opening portion opposing the one end portion of the lid in an axial direction of the lever member are rotatably fitted with each other around an axis line perpendicular to the axial direction of the lever member, and
another end portion of the lid and another end portion of the opening portion opposing the other end portion of the lid in the axial direction of the lever member are relatively movably fitted with each other in the axial direction of the lever member.

3. A lever device according to claim 2, wherein:
a first fitting portion is provided in the one end portion of the lid and in the one end portion of the opening portion, the one end portion of the opening portion opposing the one end portion of the lid in the axial direction of the lever member, to be rotatably fitted with each other around the axis line perpendicular to the axial direction of the lever member,
a second fitting portion is provided in the other end portion of the lid and in the other end portion of the opening portion opposing the other end portion of the lid in the axial direction of the lever member to be relatively movably fitted with each other in the axial direction of the lever member, wherein
the first fitting portion comprises an axis portion and a concave portion that are fitted with each other, and
the second fitting portion comprises a hole and an engagement piece that are engaged with each other.

4. A lever device according to claim 2, wherein:
the one end portion of the lid includes axis portions that extend in a direction transverse to the axial direction, and the one end portion of the opening portion includes concave portions into which the axis portions are fitted; and
the other end portion of the lid includes at least two engagement pieces extending in the axial direction, and the other end portion of the opening portion includes concave portions in which the at least two engagement pieces are fitted.

5. A lever device according to claim 4, wherein the at least two engagement pieces are each formed to be bent in an L-shape.

6. A lever device according to claim 4, wherein the other end portion of the opening portion is provided with a flange portion, the flange portion having a support surface for guiding the at least two engagement pieces into the concave portions, the support surface being tapered.

7. A lever device according to claim 4, wherein the one end portion of the lid includes two opposing support portions from each of which one of the axis portions extends, the support portions configured to be flexibly expanded and compressed to enable the axis portions to be fitted into the respective concave portions.

8. A lever device according to claim 1, wherein the lever member includes a rib opposing at least a portion of the opening portion for strengthening the lever member.

9. A lever device according to claim 8, wherein the rib is formed in at least one of a lattice shape or a mesh shape.

10. A lever device comprising:
a lever member swingably supported in a fixed system;
an opening portion provided in the lever member to open in a radial direction of the lever member; and
a lid that is engaged to the opening portion to cover the opening portion therewith, wherein an inner surface of the lid is provided with a plurality of deflecting portions and a plurality of raised portions alternating in an axial direction between uneven portions of the lid spaced apart axially, the raised portions being thicker than the deflecting portions, and the deflecting portions being configured to deflect in response to a bending moment acting on the lid at the time of a swing operation of the lever member;
wherein the lid has a plurality of support portions on the inner surface of the lid and having intervals between the plurality of support portions, the plurality of support portions being seated on an inner surface of the lever member to support the lid, and each length of the plurality of support portions is defined such that an outer surface of the lid is connected continuously to an outer surface of the lever member.

\* \* \* \* \*